(12) United States Patent
Mitsui et al.

(10) Patent No.: US 6,194,865 B1
(45) Date of Patent: Feb. 27, 2001

(54) CONTROL METHOD AND SYSTEM FOR ELECTRIC ROTARY MACHINE

(75) Inventors: Toshisada Mitsui, Hitachinaka; Nobunori Matsudaira, Hitachi; Eiichi Ohtsu, Mito, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/348,273

(22) Filed: Jul. 7, 1999

(30) Foreign Application Priority Data

Jul. 7, 1998 (JP) .................................................. 10-192032

(51) Int. Cl.[7] ...................................................... H02P 5/28
(52) U.S. Cl. ........................ 318/811; 318/812; 318/139; 318/432; 318/439; 318/138; 318/254; 318/721
(58) Field of Search ................................... 318/811, 812, 318/139, 432, 439, 138, 254, 721

(56) References Cited

U.S. PATENT DOCUMENTS 5,990,657 * 11/1999 Masaki et al. ..................... 318/811
6,037,741 * 3/2000 Yamada et al. ...................... 318/721

FOREIGN PATENT DOCUMENTS 7-107772   4/1995 (JP).

* cited by examiner

*Primary Examiner*—Karen Masih
(74) *Attorney, Agent, or Firm*—Evenson, McKeown, Edwards & Lenahan, P.L.L.C.

(57) ABSTRACT

An apparatus for steadily and efficiently controlling a synchronous motor is equipped with a function for generating dq-axis current commands so that the terminal voltage of the synchronous motor may not exceed the voltage which a power converter can output even at a current transition time, a current control function for correcting a fluctuation of a D.C. input voltage, and a function for eliminating the D.C. input power to zero when performing field weakening control. The dq-axis current command generator is so built as to retrieve current command tables listing high-efficiency data in advance by torque commands and rotational speeds of the synchronous motor. There are a plurality of current command tables converting maximum terminal voltages of the synchronous motor. A means is provided to select an optimum one of said current command tables according to the D.C. input voltage. In this case, a value obtained by subtracting a preset value from the D.C. input voltage is used for this selection of an optimum current command table.

16 Claims, 6 Drawing Sheets

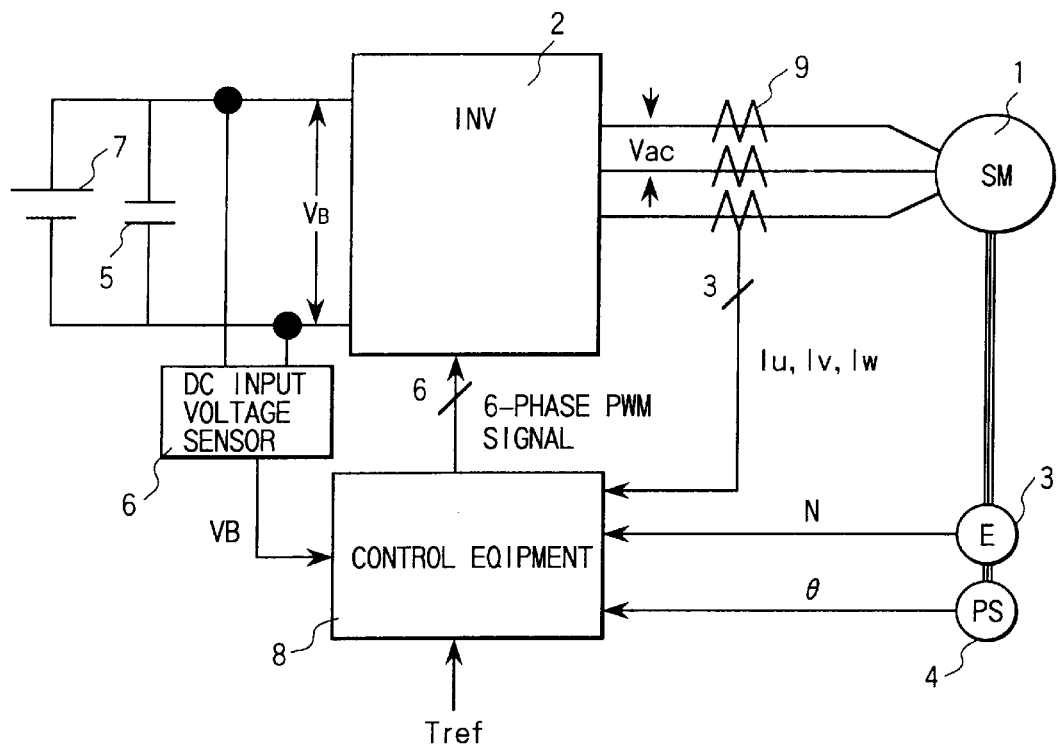
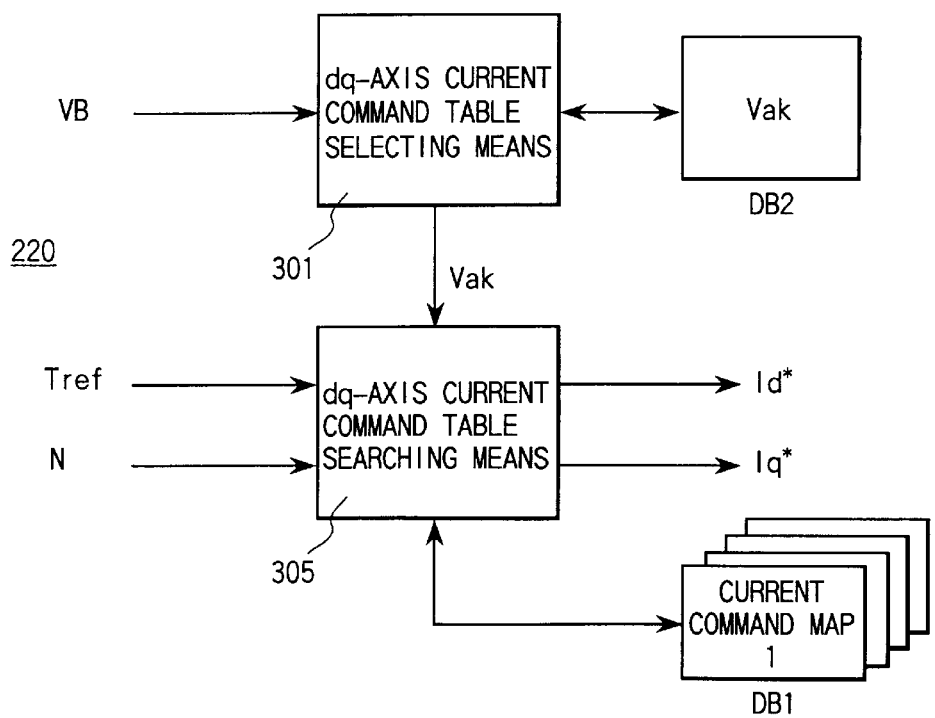

CONTROL METHOD AND SYSTEM FOR ELECTRIC ROTARY MACHINE

BACKGROUND OF THE INVENTION

1. Field of the Invention

The present invention relates to a control apparatus and method for driving an electric rotary machine such as a motor or a generator which is mounted on an electric vehicle.

2. Related Background Art

Not only industrial synchronous machines but also synchronous machines which have been widely used have a tendency that the terminal voltage of the synchronous machine, caused by a speed electromotive force, generally goes higher as the rotational speed of the synchronous machine increases. If this terminal voltage Vac goes over the maximum applied voltage Vtmax, the difference between Vac and Vtmax is applied to an inverter or power supply, which may damage a component. To prevent this, a field weakening control is performed which applies a predetermined negative field weakening current to the d axis to keep Vac equal to or less than Vtmax. This field weakening current is predetermined according to torques and rotational speeds of the machine so that Vac may not exceed Vtmax even when the battery voltage is low.

When the inverter-on voltage is ignored, the maximum A.C.(alternating current) voltage Vtmax which the power converter can apply is determined by a battery voltage VB as shown by Equation (1). Accordingly, if the battery voltage VB is high enough, the efficiency can be increased by reducing the magnitude of the field weakening current and the quantity of current flow.

$$Vtmax = (\sqrt{3}/2\sqrt{2})VB \tag{1}$$

With regard to this point, Japanese Non-examined Patent Publication No.07-107772 discloses a method for increasing the efficiency without applying an excessive field weakening current. This method consists of always detecting a battery voltage, calculating a maximum impression voltage of the voltage converter by Equation (1), and determining the d-axis current command value Id* that makes the terminal voltage Vac of the synchronous motor equal to Vtmax by Equations (2) and (3) which represent a steady status. In Equation (2), R is a primary resistance, ω is an electric angular velocity of a motor, Ld is a d-axis inductance, Lq is a q-axis inductance, E0 is a number of flux interlinkages, Vd is a d-axis voltage, and Vq is a q-axis voltage.

$$\begin{bmatrix} Vd \\ Vq \end{bmatrix} = \begin{bmatrix} R & -\omega \cdot Lq \\ \omega \cdot Lq & R \end{bmatrix} \begin{bmatrix} Id \\ Iq \end{bmatrix} + \begin{bmatrix} 0 \\ \omega \cdot E0 \end{bmatrix} \tag{2}$$

$$Vac = \sqrt{(Vd^2 + Vq^2)} \tag{3}$$

An electric vehicle has two problems as the D.C. input voltage value temporarily varies due to consumption of battery power, driving of auxiliary units, and torque motoring/regeneration, and the dq-axis currents transit repeatedly and frequently.

First, a method disclosed in Japanese Non-examined Patent Publication No.07-107772 does not include the current transition status. At the time of a current transition, said Equation (2) has a term expressed by Equation (4) on its right side. Accordingly, the actual terminal voltage V1 of the synchronous motor becomes higher than Vac calculated by Equations (2) and (3) and it temporarily exceeds Vtmax.

$$\begin{bmatrix} VdL \\ VqL \end{bmatrix} = \begin{bmatrix} s \cdot Ld \cdot Id \\ s \cdot Lq \cdot Iq \end{bmatrix} \tag{4}$$

The second problem of the prior art is that the dq-axis currents are disturbed by a change of a D.C. input voltage value and a requested torque (torque command) cannot be accomplished exactly. For instance, when the D.C. input voltage drops down to 400V while a predetermined dq-axis current is applied at 500V of the D.C. input voltage, the A.C. voltage actually output from the power converter is multiplied by 400/500. Consequently, the dq-axis current value deviates from the predetermined value for a time period until the dq-axis compensating voltage command in the control equipment takes a value fit for the D.C. input voltage of 400V. Necessarily, the requested torque cannot be accomplished exactly.

In relation to the first problem, also when only a field weakening control is performed to keep the terminal voltage of the synchronous motor under a predetermined value, a battery power equivalent to the losses of the power converter and the synchronous motor is consumed, which reduces the distance per charging that the vehicle can run.

SUMMARY OF THE INVENTION

Accordingly, it is an object of the present invention to solve the above problems and provide a control apparatus and method of controlling an electric rotary machine efficiently and steadily.

The features of the present invention are to provide 1) a function for generating dq-axis current commands so that the terminal voltage of the synchronous motor may not exceed the voltage which a power converter can output even at a current transition time, 2) a voltage command correcting function for correcting a fluctuation of a D.C. input voltage, and 3) a function for eliminating the D.C. input power to zero when performing field weakening control.

A control apparatus for controlling an electric rotary machine which is connected to a battery via a power converter in accordance with the present invention comprises: a D.C. input voltage detecting means for detecting a D.C. input voltage of said power converter, a current and rotational speed detecting means for detecting a 3-phase Alternating current and the rotational speed of said electric rotary machine, a dq-axis current command generating means for generating dq-axis current commands of said electric rotary machine such as operation commands to control the output of said electric rotary machine according to input signals, a dq-axis voltage correction value calculating means for calculating a dq-axis voltage correction value from said dq-axis current command and a dq-axis current detection value of said electric rotary machine, a 3-phase A.C. voltage command value generating means for generating a 3-phase A.C. voltage command value from said dq-axis voltage correction value and phases of said electric rotary machine, and a PWM control means for outputting a PWM signal to drive said power converter from said A.C. voltage command value. Said dq-axis current command generating means consists of a maximum impression voltage calculating means for generating the maximum impression voltage of said power converter from said D.C. input voltage value, a permissible maximum voltage calculating means for calculating a permissible maximum voltage by subtracting a preset value from said maximum impression voltage, and a dq-axis voltage command calculating means for calculating a dq-axis voltage command to increase the efficiency of said electric rotary machine and said power converter from said input signal and said rotational speed of said electric rotary machine under conditions that the terminal voltage of said electric rotary machine is under said permissible maximum voltage.

More concrete features of the present invention to generate dq-axis current commands so that the terminal voltage of the synchronous motor may not exceed the voltage which a power converter can output even at a current transition time in accordance with said first function: Said dq-axis current command generating means consists of a maximum impression voltage calculating means for generating the maximum impression voltage of said power converter from said D.C. input voltage value, a permissible maximum voltage calculating means for calculating a permissible maximum voltage by subtracting a preset value from said maximum impression voltage, and a dq-axis voltage command calculating means for calculating a dq-axis voltage command to increase the efficiency of said electric rotary machine and said power converter from said input signal and said rotational speed of said electric rotary machine under conditions that the terminal voltage of said electric rotary machine is under said permissible maximum voltage.

Even at a transition time when current commands are changed, it is possible to drive the electric rotary machine in the range of an impression voltage that the power converter outputs by selecting an optimum dq-axis current command table by a difference between the D.C. input voltage value and a preset value and by obtaining a dq-axis current command according to the dq-axis current command table. The function of generating a dq-axis current command can be accomplished by a simple algorithm when it is made up with a table selecting means and a table retrieving means.

For correction of fluctuation of the D.C. input voltages by the voltage command correcting function which is the second function of an apparatus in accordance with the present invention, another concrete feature of the present invention uses the D.C. input voltage detected by said D.C. voltage detecting means to calculate a 3-phase A.C. voltage command.

A stable control without increasing the gain in calculation of the amount of dq-axis voltage correction can be accomplished by directly correcting the D.C. voltage command by a battery voltage.

When only the field weakening control is executed to reduce the D.C. input power to zero, which is said third function, the consumption of battery power can be reduced to zero by regenerating a power which is lost in the motor and the power converter and nullifying the D.C. power input. When only the field weakening control is executed without generating a torque, the consumption of battery power can be reduced to zero by regenerating a power which is lost in the motor and the power converter from the motor.

BRIEF DESCRIPTION OF THE DRAWINGS

FIG. 1 shows the configuration of a system for driving an electric rotary machine equipped with a motor controlling apparatus which is a first embodiment of the present invention.

FIG. 3 shows the internal configuration of the dq-axis current command generating means of FIG. 2.

DETAILED DESCRIPTION OF PREFERRED EMBODIMENTS

Figure 2:
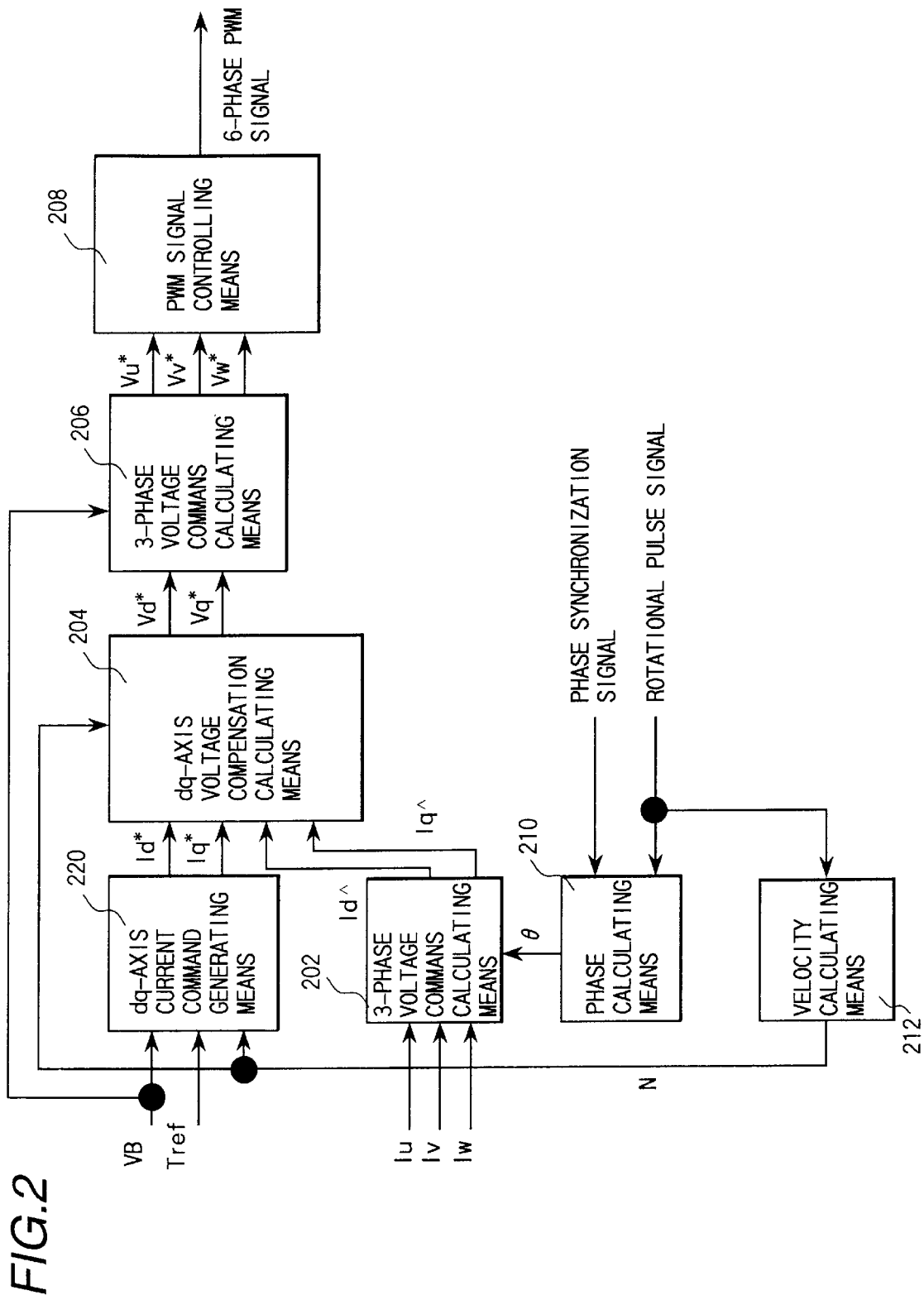
FIG. 2 is a detailed functional block diagram of the control apparatus of FIG. 1.

The present invention will be described in detail below, referring to the accompanying drawings. FIG. 1 shows the configuration of a drive control system for an electric vehicle, which is a first embodiment of this present invention. The synchronous motor 1 is a permanent magnet type synchronous motor which is supplied with power from the battery 7 through a power inverter as a power converter 2. To the permanent magnet type synchronous motor 1 are connected an encoder 3 which is a rotational speed sensor and a pole position sensor 4 which detects positions of magnetic poles. These sensors send information about phases and rotational speeds to the control apparatus 8. To the D.C. input side of the power converter 2 are connected a capacitor 5 which smoothes the input voltage and a D.C. input voltage sensor 6 which measures a D.C. voltage input to the power converter 2. These parts send a D.C. input voltage value to the control apparatus 8. A current sensor 9 for measuring the alternating current of the synchronous motor 1 is connected to each phase (U, V, and W) of the A.C. power output of the power converter 2. These sensors send the alternating current value of each phase to the control apparatus 8. The control apparatus 8 receives signals from the encoder 3, the pole position sensor 4, the current sensor 9 and the D.C. input voltage sensor 6 and a torque command Tref from a circuit which is not shown in FIG. 1 and sends a 6-phase PWM signal to the power converter 2 to control the output voltages of the power converter 2 and to output a torque requested by the torque command Tref.

FIG. 2 is a detailed functional block diagram showing a motor control apparatus 8 which controls a permanent magnet type synchronous motor 1. Said motor control apparatus 8 is equipped with a dq-axis current command generating means 220, a 3-phase-to-2-phase converting means 202, a dq-axis current correction quantity calculating means 204, a 3-phase A.C. voltage command calculating means 206, a PWM signal controlling means 208, a phase calculating means 210, and a speed calculating means 212. Said speed calculating means 212 whose input is connected to an encoder 3 performs a speed calculation and outputs a number or revolutions N. Said phase calculating means 210 whose input is connected to the encoder 3 and a pole position detecting means 4 performs a phase calculation and outputs a phase angle θ. Said dq-axis current command generating means 220, said 3-phase-to-2-phase converting means 202, said dq-axis current correction quantity calculating means 204, and said 3-phase A.C. voltage command calculating means 206 are accomplished by a computer which contains a program stored in memory ROM, a CPU which reads the program and executes predetermined processes according to the program, and memory RAM which stores said program, functions, constants, and data required for processing.

As described above, the feature of the present invention is to provide 1) a function for generating dq-axis current commands so that the terminal voltage of the synchronous motor may not exceed the voltage which a power converter can output even at a current transition time, 2) a voltage command correcting function for correcting a fluctuation of a D.C. input voltage, and 3) a function for eliminating the D.C. input power to zero when performing field weakening control. The following configurations are given to respectively illustrate said functions.

First is explained the first function that generates dq-axis current commands so that the terminal voltage of the synchronous motor may not exceed the voltage which a power converter can output even at a current transition time.

Referring now to FIG. 3 which illustrates the configuration of the dq-axis current command generating means 220, the dq-axis current command generating means 200 comprises a dq-axis current command table selecting means 301 which selects an optimum current command table by a D.C. input voltage value and a dq-axis current command table retrieving means 305 which searches a d-axis current command Id* and a q-axis current command Iq* in the table data selected by the dq-axis current command table selecting means 301 by using the torque command Tref and the rotational speed of the synchronous motor as parameters.

Figure 4:
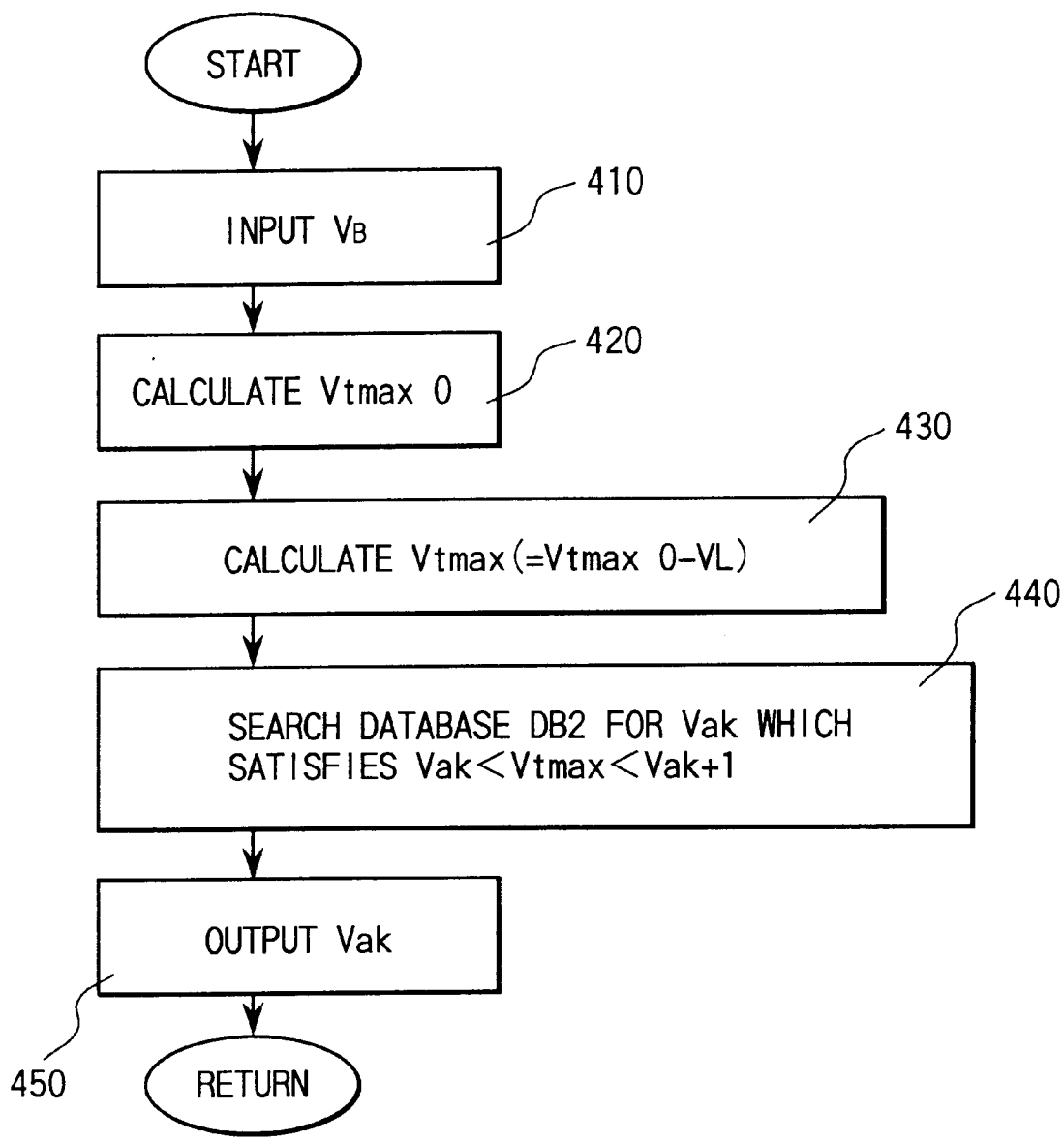
FIG. 4 shows an operational flow of the dq-axis current command table selecting means.

Referring to FIG. 4 which illustrates an operational flow of the dq-axis current command table selecting means 301, the dq-axis current command table selecting means 301 receives a D.C. input voltage value VB (step 410) from the D.C. input voltage sensor 6 mounted on the power converter 2, calculates the A.C. voltage maximum value Vtmax0 (step 420) in the steady state by Equation (1), and gets a permissible maximum voltage Vtmax by subtracting a voltage VL equivalent to a current change from Vtmax0 (step 430).

To calculate the permissible maximum voltage Vtmax, a voltage VL equivalent to a current change is first calculated by Equations (4) and (11).

$$VL = \sqrt{(VdL^2 + VqL^2)} \quad (11)$$

As the characteristics of the battery voltage VB are expressed by Equation (12), the battery voltage increment dVB by the change of a torque command is estimated by Equation (13) as another example and added to VL.

$$VB = VB0 - Ri \ldots Ib \quad (12)$$

$$dVB = Ri \ldots dIb \quad (13)$$

Wherein VB is a battery voltage, VB0 is an open voltage, Ri is an internal resistance of the battery, Ib is a battery current and DIb is an increment or decrement of the battery current.

Said dq-axis current command table selecting means 301 searches the database DB2 (to be described later) for a permissible maximum voltage Vak which satisfies Vak<Vtmax<Vak+1 (step 440), outputs the table specifying information Vak to the dq-axis current command table retrieving means 305 (step 405), and ends processing.

The databases DB1 and DB2 will now be explained below. Let us assume that tables Map_fd[Vak] and Map_fq[Vak] respectively have a list of combinations of Id* and Iq* that will increase the total efficiency of the synchronous motor 1 and the power converter 2 most together with torque command Tref and the rotational number N of the synchronous motor as parameters under a condition that the maximum output voltage of the power converter 2 is Vak. When a torque command Tref and a rotational number N of the synchronous motor are specified for these tables, the following Id* and Iq* are obtained:

Id*=Map_fd [Vak] (torque command Tref and a rotational number N of the synchronous motor)

Iq*=Map_fq [Vak] (torque command Tref and a rotational number N of the synchronous motor)

The database DDB1 contains "n" Map_fd tables (Map_fd[Va1], Map_fd[Va2], Map_fd[Va3], . . . Map_fd[Vak], . . . Map_fd[Van]) and "n" Map_fq tables (Map_fq[Va1], Map_fq[Va2], Map_fq[Va3], . . . Map_fq[Vak], . . . Map_fq[Van]). The Vak values satisfy Va1<Va2<Va3< . . . <Vak<Vak+1< . . .<Van. The database DDB2 contains Va1, Va2, Va3, . . . Vak, . . . , Van.

Figure 5:
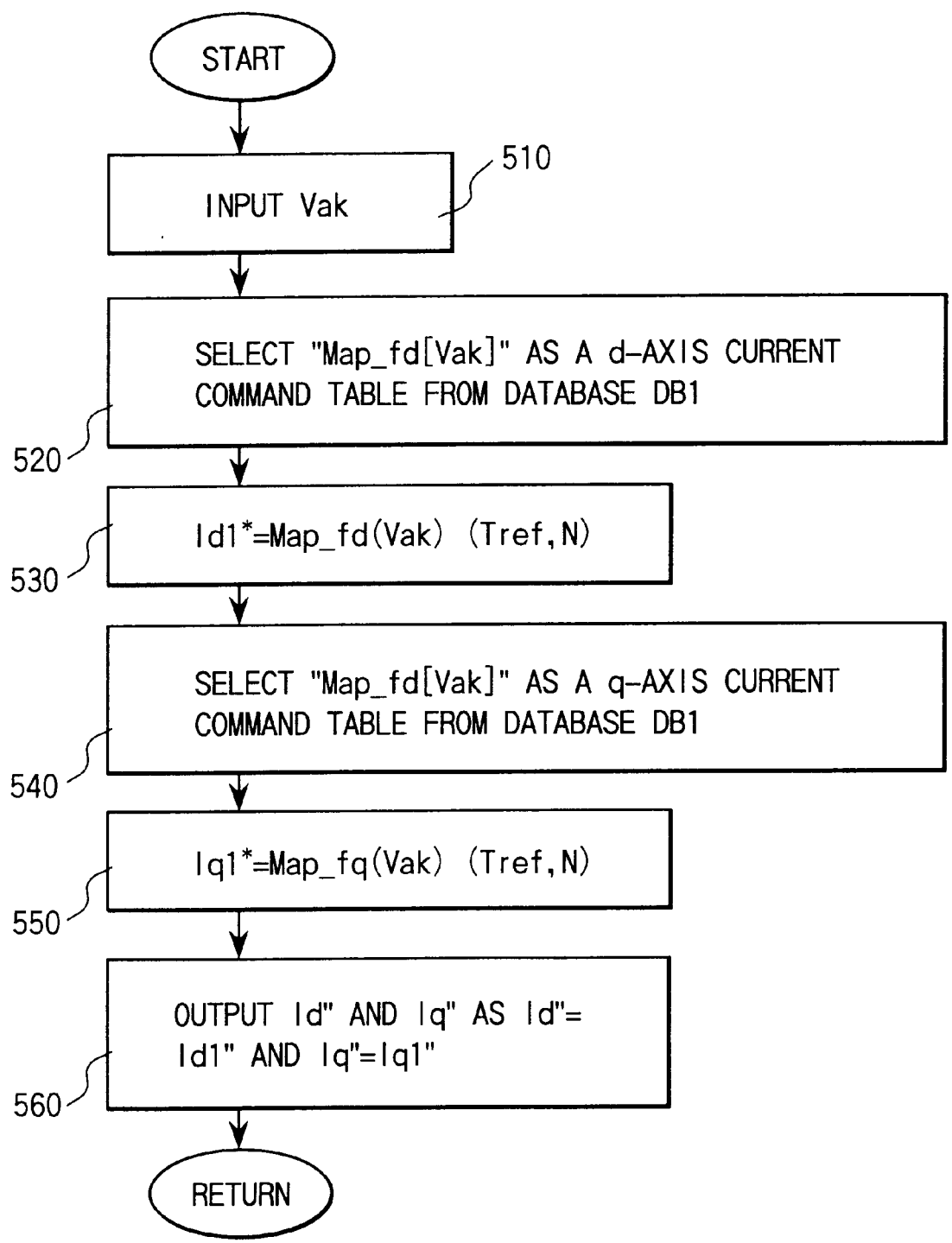
FIG. 5 shows an operational flow of the dq-axis current command table retrieving means.

Referring to FIG. 5 which illustrates an operational flow of the dq-axis current command table retrieving means 305, the dq-axis current command table retrieving means 305 receives table specifying information Vak from the dq-axis current command table selecting means 301 (step 510), selects Map_fd[Vak] in the database DB1 as a d-axis table (step 520), and obtains Id1* by its torque command Tref and rotational number N of the synchronous motor (step 530). In the similar way, the dq-axis current command table retrieving means 305 obtains Iq1* by selecting Map_fq[Vak] in the database DB1 as a q-axis table (step 540), and searching by its torque command Tref and rotational number N of the synchronous motor (step 550). The dq-axis current command table retrieving means 305 outputs Id* as Id1* and Iq* as Iq1* (step 560) and ends processing. In case Vak and Vak+1 are not small enough in relation to the capacitance of ROM, it is also possible to obtain Id* and Iq* by getting Id2* and Iq2* from tables Map_fd[Vak+1 ] and Map_fq [Vak+1 ] in the similar manner and estimating Id* and Iq* by means of interpolation of Id1*, Id2*, Iq1*, and Iq2* using the rate of (Vtmax−Vak):(Vak+1−Vtmax).

Figure 6:
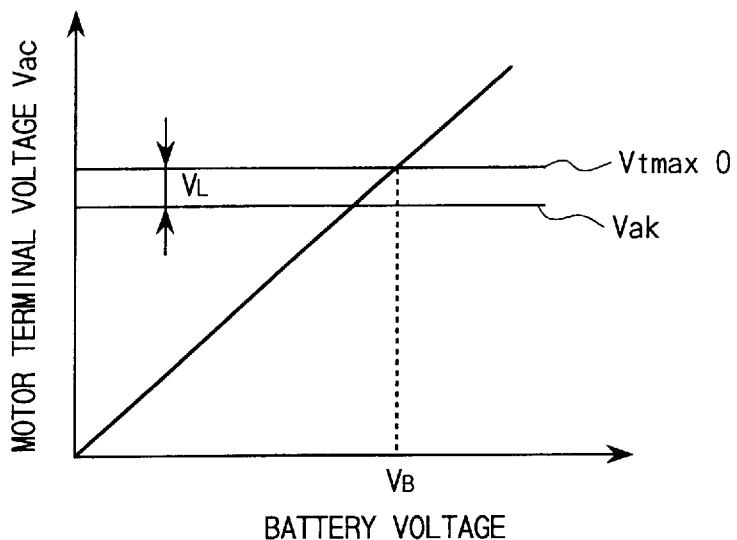
FIG. 6 shows the relationship between the battery voltage and the terminal voltage of a motor.

With the above-described configuration, the first function of a control apparatus in accordance of the present invention can be accomplished. In other words, the configuration enables a function for generating dq-axis current commands so that the terminal voltage of the synchronous motor may not exceed the voltage which a power converter can output even at a current transition time. FIG. 6 shows a relationship between battery voltage and terminal voltage of a motor. In accordance with the present invention, the terminal voltage of the motor is set to a value which is the difference between the maximum impression voltage of the power converter and a preset value which is a voltage VL equivalent to a current change in a transient operation. Therefore, the terminal voltage is controlled to be always under the permissible maximum voltage Vak. The preset value VL is big enough to eliminate the fluctuation of the motor driving voltage in the transient operation.

Next is explained an embodiment pertaining to the second function that corrects a fluctuation of a D.C. input voltage.

Figure 7:
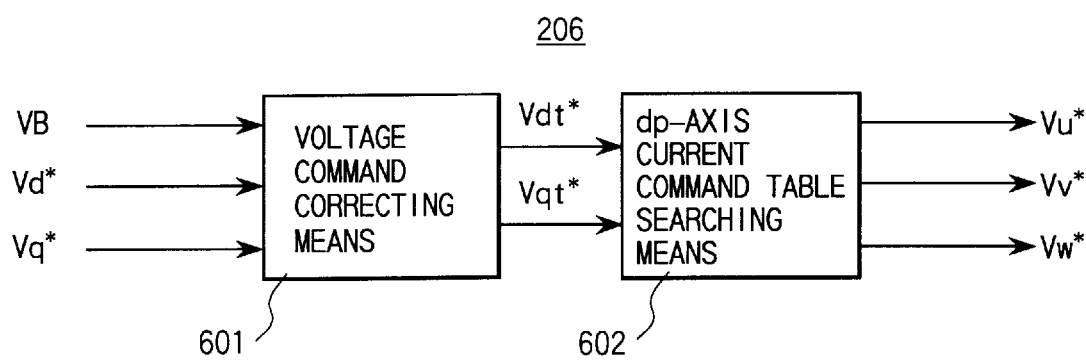
FIG. 7 shows the internal configuration of the 3-phase A.C. voltage command value generating means.

Referring to FIG. 7 which illustrates the configuration of the 3-phase A.C. voltage command value generating means 206, said means 206 consists of a voltage command correcting means 601 which corrects Vd* and Vq* from the dq-axis current correction quantity calculating means 204 according to the D.C. input voltage value VB from the D.C. input voltage sensor 6 and a 2-phase-to-3-phase converting means 602 which receives Vd1* and Vq1* from the voltage command correcting means 601 and generates voltage commands of three phases Vu*, Vv*, and Vw*.

The inverter gain correcting means 601 calculates the quantity of correction Kinv by Equation (5) and corrects Vd1* and Vq1* by Equations (6) and (7).

$$Kinv = VB\_base/VB) \quad (5)$$

$$Vd1^* = Kinv \cdot Vd^* \quad (6)$$

$$Vq1^* = Kinv \cdot Vq^* \quad (7)$$

This example performs correction before the 2-phase-to-3-phase conversion by the 2-phase-to-3-phase converting means 602. However, it is possible to first calculate voltage commands of three phases Vu0*, Vv0*, and Vw0* of Vd* and Vq* and then perform the following correction.

$$Vu^* = Kinv \cdot Vu0^* \quad (8)$$

$$Vv^* = Kinv \cdot Vv0^* \quad (9)$$

$$Vw^* = Kinv \cdot Vw0^* \quad (10)$$

Further it is possible to estimate a battery voltage fluctuation value dVB at a change of a torque command by Equation (13) and substitute Equation (5) by Equation (14).

$$Kinv = VB\_base/(VB - dVB) \quad (14)$$

Further is explained an embodiment pertaining to the third function that eliminates the D.C. input power to zero for execution of a field weakening control only.

Figure 8:
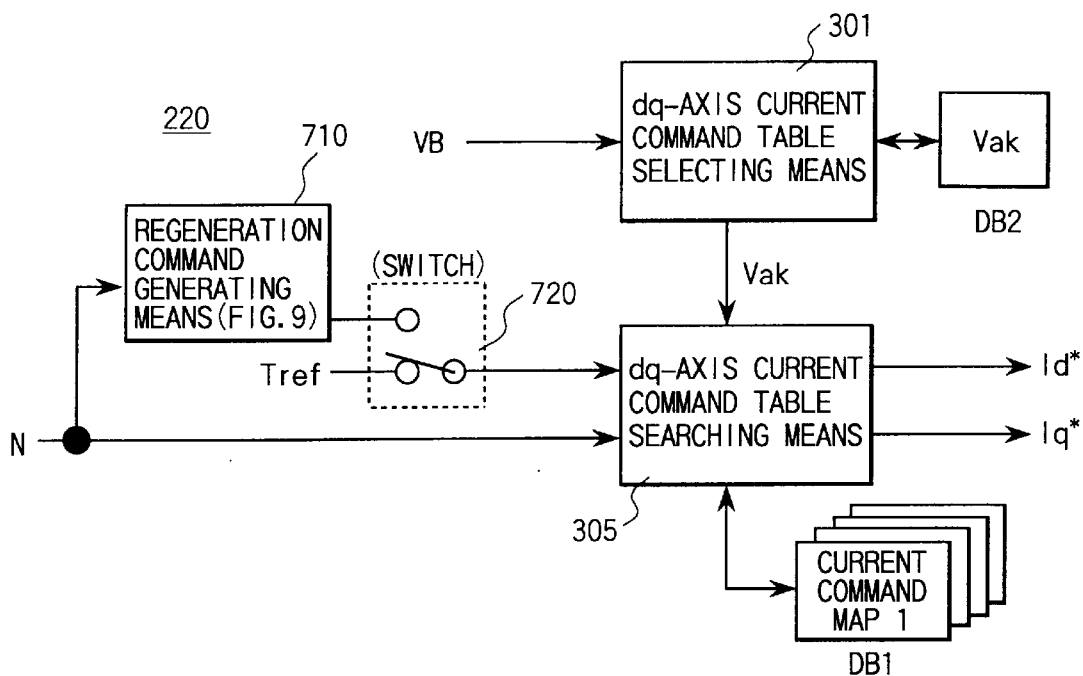
FIG. 8 shows the configuration of a dq-axis current generating means with a regeneration command generating means, which is a second embodiment of the dq-axis current generating of FIG. 2.

Referring to FIG. 8 which illustrates the configuration of the dq-axis current command generating means 220, the a dq-axis current command table selecting means 301 and a dq-axis current command table retrieving means 305 are the same as those already described above. The dq-axis current command generating means 220 further has a regeneration command generating means 710 which generates regeneration commands according to the rotational number N of the synchronous motor and a switch 720 which switches between "Torque command Tref" and "Regeneration command Tneg."

Figure 9:
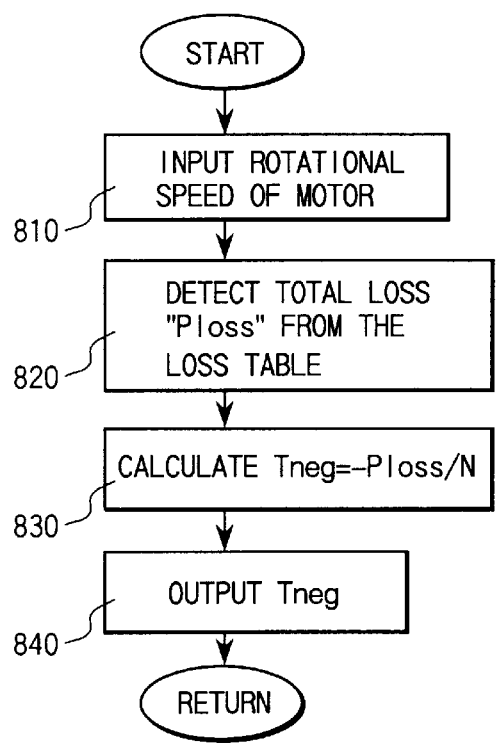
FIG. 9 shows an operational flow of the regeneration command generating means of FIG. 8.

Referring to FIG. 9 which illustrates an operational flow of the regeneration command generating means 710, this means 710 receives a rotational number N of the synchronous motor (step 810), searches a loss table which lists total losses of the motor and the power converter at rotational speeds by the rotational number N, outputs a total loss which is found (step 820), calculates the regeneration command Tneg (step 830), outputs the command Tbeg (step 840) and ends processing.

The switch 720 functions to select "Torque command Tref" when both Condition 1 and Condition 2 are satisfied or "Regeneration command Tneg" in the other cases.

Condition 1: The torque command Tref is zero.

Condition 2: The rotational number N of the synchronous motor is Nbase or more.

As described above, the embodiment of the present invention can drive a synchronous motor in the range of an impression voltage that the power converter outputs even at a transition of current commands by selecting an optimum dq-axis current command table by a difference between the D.C. input voltage value and a preset value and by obtaining a dq-axis current command according to the dq-axis current command table. The function of generating a dq-axis current command can be accomplished by a simple algorithm when it is made up with a table selecting means and a table retrieving means.

A stable control without increasing the gain in calculation of the amount of dq-axis voltage correction can be accomplished by directly correcting the D.C. voltage command by a battery voltage.

When only the field weakening control is executed without generating a torque, the consumption of battery power can be reduced to zero by regenerating a power which is lost in the motor and the power converter from the motor.

Having described the present invention as related to the embodiment using the present invention to control a synchronous motor, the present invention is also applicable to control not only motors including induction types but also generating units.

The present invention can provide a control apparatus and method for steadily and efficiently controlling an electric rotary machine.

What is claimed is:

1. A control apparatus for controlling an electric rotary machine which is connected to a battery via a power converter, comprising: a D.C. input voltage detecting means for detecting a D.C. input voltage of said power converter, a current and rotational speed detecting means for detecting a 3-phase alternating current and the rotational speed of said electric rotary machine, a dq-axis current command generating means for generating dq-axis current commands of said electric rotary machine including operation commands to control the output of said electric rotary machine according to input signals, a dq-axis voltage correction value calculating means for calculating a dq-axis voltage correction value from said dq-axis current command and a dq-axis current detection value of said electric rotary machine, a 3-phase A.C. voltage command value generating means for generating a 3-phase A.C. voltage command value from said dq-axis voltage correction value and phases of said electric rotary machine, and a PWM control means for outputting a PWM signal to drive said power converter from said A.C. voltage command value, wherein said dq-axis current command generating means includes a maximum impression voltage calculating means for generating the maximum impression voltage of said power converter from said D.C. input voltage value, a permissible maximum voltage calculating means for calculating a permissible maximum voltage by subtracting a preset value from said maximum impression voltage, and a dq-axis current command calculating means for calculating a dq-axis current command to increase the efficiency of said electric rotary machine and said power converter from said input signal and said rotational speed of said electric rotary machine under conditions wherein the terminal voltage of said electric rotary machine is below said permissible maximum voltage.

2. A control apparatus for controlling an electric rotary machine as claimed in claim 1, wherein said 3-phase A.C. voltage command value generating means corrects said dq-axis voltage command by using a D.C. input voltage detected by said D.C. voltage detecting means in calculation of a 3-phase A.C. voltage command.

3. A control apparatus for controlling an electric rotary machine as claimed in claim 1, wherein said preset value which said permissible maximum voltage calculating means subtracts from said maximum impression voltage is big enough to eliminate the fluctuation of the rotary machine driving voltage in a transient operation.

4. A control apparatus for controlling an electric rotary machine as claimed in claim 2, wherein said electric rotary machine is a permanent magnet type synchronous machine, wherein said dq-axis current command generating means is so built as to retrieve current command tables listing high-efficiency data in advance by torque commands and rotational speeds of the synchronous motor, wherein said current command tables contain a plurality of value sets converting maximum terminal voltages of the synchronous motor, wherein said dq-axis current command generating means contains a current command table switching means to select an optimum one of said current command tables according to said D.C. input voltage, and wherein said current command table switching means uses a value obtained by subtracting a preset value from said D.C. input voltage for this selection of an optimum current command table.

5. A control apparatus for controlling an electric rotary machine as claimed in claim 1, wherein said permissible maximum voltage calculating means which calculates a permissible maximum voltage by subtracting a preset value from said maximum impression voltage estimates a change of said battery voltage when an input command changes and adds thereof to said preset value.

6. A control apparatus for controlling an electric rotary machine as claimed in claim 1, wherein said 3-phase A.C. voltage command value generating means which generates a 3-phase A.C. voltage command value from said A.C. voltage command value uses a D.C. input voltage value detected by said D.C. voltage detecting means to correct said voltage command.

7. A control apparatus for controlling an electric rotary machine as claimed in claim 1, wherein a power loss made by said electric rotary machine and said power converter is regenerated from said electric rotary machine to eliminate the input of said D.C. power to zero when only the field weakening control is executed.

8. A control apparatus for controlling an electric rotary machine as claimed in claim 4, wherein a change of said battery voltage is estimated from a D.C. input voltage value which is detected by said D.C. voltage detecting means when an input command changes and said estimated value is subtracted.

9. A control apparatus for controlling an electric rotary machine as claimed in claim 2, wherein said preset value which said permissible maximum voltage calculating means subtracts from said maximum impression voltage is big enough to eliminate the fluctuation of the rotary machine driving voltage in a transient operation.

10. A control apparatus for controlling an electric rotary machine as claimed in claim 2, wherein said permissible maximum voltage calculating means which calculates a permissible maximum voltage by subtracting a preset value from said maximum impression voltage estimates a change of said battery voltage when an input command changes and adds thereof to said preset value.

11. A control apparatus for controlling an electric rotary machine as claimed in claim 3, wherein said permissible maximum voltage calculating means which calculates a permissible maximum voltage by subtracting a preset value from said maximum impression voltage estimates a change of said battery voltage when an input command changes and adds thereof to said preset value.

12. A control apparatus for controlling an electric rotary machine as claimed in claim 4, wherein said permissible maximum voltage calculating means which calculates a permissible maximum voltage by subtracting a preset value from said maximum impression voltage estimates a change of said battery voltage when an input command changes and adds thereof to said preset value.

13. An electric vehicle, comprising:

an electric motor as a drive source; and a control apparatus for controlling said electric motor which is connected to a battery via a power converter, comprising: a D.C. input voltage detecting means for detecting a D.C. input voltage of said power converter, a current and rotational speed detecting means for detecting a 3-phase alternating current and the rotational speed of said electric motor, a dq-axis current command generating means for generating dq-axis current commands of said electric motor including operation commands to control the output of said electric motor according to input signals, a dq-axis voltage correction value calculating means for calculating a dq-axis voltage correction value from said da-axis current command and a dq-axis current detection value of said electric motor, a 3-phase A.C. voltage command value generating means for generating a 3-phase A.C. voltage command value from said dq-axis voltage correction value and phases of said electric motor, and a PWM control means for outputting a PWM signal to drive said power converter from said A.C. voltage command value, wherein said dq-axis current command generating means includes a maximum impression voltage calculating means for generating the maximum impression voltage of said power converter from said D.C. input voltage value, a permissible maximum voltage calculating means for calculating a permissible maximum voltage by subtracting a preset value from said maximum impression voltage, and a dq-axis current command calculating means for calculating a dq-axis current command to increase the efficiency of said electric motor and said power converter from said input signal and said rotational speed of said electric motor under conditions wherein the terminal voltage of said electric motor is below said permissible maximum voltage.

14. An electric vehicle according to claim 9, wherein said 3-phase A.C. voltage command value generating means corrects said dq-axis voltage command by using a D.C. input voltage detected by said D.C. voltage detecting means in calculation of a 3-phase A.C. voltage command.

15. An electric vehicle according to claim 15, wherein said electric motor is a permanent magnet type synchronous machine, wherein said dq-axis current command generating means is so built as to retrieve current command tables listing high-efficiency data in advance by torque commands and rotational speeds of the synchronous motor, wherein said current command tables contain a plurality of value sets converting maximum terminal voltages of the synchronous motor, wherein said dq-axis current command generating means contains a current command table switching means to select an optimum one of said current command tables according to said D.C. input voltage, and wherein said current command table switching means uses a value obtained by subtracting a preset value from said D.C. input voltage for this selection of an optimum current command table.

16. A control method for controlling an electric rotary machine connected to a battery via a power converter, which comprises a D.C. input voltage detecting means for detecting a D.C. input voltage of said power converter, a current and rotational speed detecting means for detecting a 3-phase Alternating current and the rotational speed (r.p.m.) of said electric rotary machine, a current command generating means for generating d-axis and q-axis current commands of said electric rotary machine to control the output of said electric rotary machine according to input signals such as operation commands, a dq-axis current detecting means for detecting a dq-axis current of said electric rotary machine from said 3-phase Alternating current and phases of said electric rotary machine, a dq-axis voltage correction value calculating means for calculating a dq-axis voltage correction value from said dq-axis current command and a dq-axis current detection value of said electric rotary machine, a 3-phase A.C. voltage command value generating means for generating a 3-phase A.C. voltage command value from said dq-axis voltage correction value and phases of said electric rotary machine, and a PWM control means for outputting a PWM signal to drive the power element of said power converter from said A.C. voltage command value, wherein the control method further comprises the steps of:

generating the maximum impression voltage of said power converter from said D.C. input voltage value and calculating a permissible maximum voltage by subtracting a preset value from said maximum impression voltage by the permissible maximum voltage calculating means of said dq-axis current command generating means, calculating a dq-axis voltage command to increase the efficiency of said electric rotary machine and said power converter from said input signal and said rotational speed of said electric rotary machine under conditions that the terminal voltage of said electric rotary machine is under said permissible maximum voltage by said dq-axis voltage command calculating means, and correcting said dq-axis voltage command by using a D.C. input voltage detected by said D.C. voltage detecting means in calculation of a 3-phase A.C. voltage command by said 3-phase A.C. voltage command value generating means.

* * * * *